March 23, 1971 D. ROSENBERG 3,572,375
TWIN VALVE T-CONNECTOR
Filed March 5, 1968 2 Sheets-Sheet 1

March 23, 1971  D. ROSENBERG  3,572,375
TWIN VALVE T-CONNECTOR

Filed March 5, 1968  2 Sheets-Sheet 2

United States Patent Office 3,572,375
Patented Mar. 23, 1971

3,572,375
TWIN VALVE T-CONNECTOR
David Rosenberg, 12 Francis Court,
Glen Cove, N.Y. 11542
Continuation-in-part of application Ser. No. 643,083,
June 2, 1967. This application Mar. 5, 1968, Ser.
No. 710,609
Int. Cl. F16k 15/14
U.S. Cl. 137—512
17 Claims

ABSTRACT OF THE DISCLOSURE

A twin valve T-connector is provided, for use with syringes and like injecting devices for use in the administration of medicaments, to supply or withdraw fluids in a volume greater than the capacity of the syringe.

---

This application is a continuation-in-part of application Ser. No. 643,083, filed June 2, 1967, now Pat. No. 3,447,479.

This invention provides a twin valve T-connector for use in the administration of medicaments, for injecting fluids into or withdrawing fluids from the body, and more particularly, a twin valve T-connector for use with syringes, in injecting into or removing from the body a volume of fluid greater than the capacity of the syringe.

Syringes are widely used in medicine for the injection of fluids into the body, or for withdrawal of fluids from the body. Frequently, the volume of fluid that is to be injected or withdrawn is greater than the available capacity of the syringe. This requires two or more injections or withdrawals, with a corresponding number of insertions of the syringe needle into the body.

In order to avoid this problem, Y-couplings have been provided, such as are described in U.S. Pat. No. 986,263 to Bevill, patented Mar. 7, 1911, which permits the connection of the syringe to an additional reserve container. The coupling is provided with valves, to regulate the flow of fluid in the proper direction, and prevent any backflow thereof, and these valves are connected with the Y-coupling by a section of flexible tubing. This device is large and clumsy, however, and has never been widely employed, partly because it is really only useful with syringes of very large volume, whereas the problem most frequently is encountered when the syringes have a very small volume. In such cases, the Beville device is virtually useless.

In accordance with the invention, a twin valve T-connector is provided, which combines in one unit a coupling body having three passages therethrough that are interconnected, and two check valves, one each in two of the passages, ensuring that flow of fluid through such passages of the connector proceeds only in one direction. The T-connector is in one unit, having one or a plurality of parts that are fitted and secured together in a unit construction, with the valves fixed in the two passages therein in a leak-tight manner, and lends itself to fabrication by molding or casting to a predetermined shape. This not only simplifies the manufacture of the T-connector, but also makes it suitable for mass production, and thus reduces its cost to a minimum.

In a preferred embodiment of the device, the coupling is made entirely of plastic, with the exception of the check valves, which can be of a plastic or rubber material, and the plastic components of the coupling are all united together, with the check valves locked in position, and with mating and/or standard fittings, joints or sockets in each of the three passages, for coupling thereof to a syringe of conventional construction, a delivery means, and a receptacle or fluid supply. A preferred type of mating joint or socket is a Luer fitting or Luer-Lok.

The invention accordingly provides a twin valve T-connector for coupling a syringe to a liquid medicament supply, for delivery to a body via a fluid delivery device of a volume of liquid medicament in excess of the capacity of the syringe, comprising, in combination, a coupling body having three interconnected passages therethrough, check valves in two of said passages controlling flow of fluid therethrough in a single direction, and means at an outer portion of each passage adapted for connection of said passage and the coupling to at least one member selected from the group consisting of a liquid medicament supply container, a fluid delivery device, and a syringe, the body being formed of plastic and holding the valves therein as one unit.

A feature of the T-connector according to the invention is its extremely small internal volume or fluid retention. This is usually less than 1 cc., and is preferably less than 0.1 cc. This means that quite high operating pressures can be achieved using conventional medical syringes, and also that very little of the fluid being delivered or withdrawn is wasted within the T-connector.

A further feature is that it can be made of a rigid, non-pressure-deformable material, which means that none of the available fluid pressure delivered via the syringe is lost in distending the connector.

In the drawings, like numbers refer to like parts.

Figure 1:
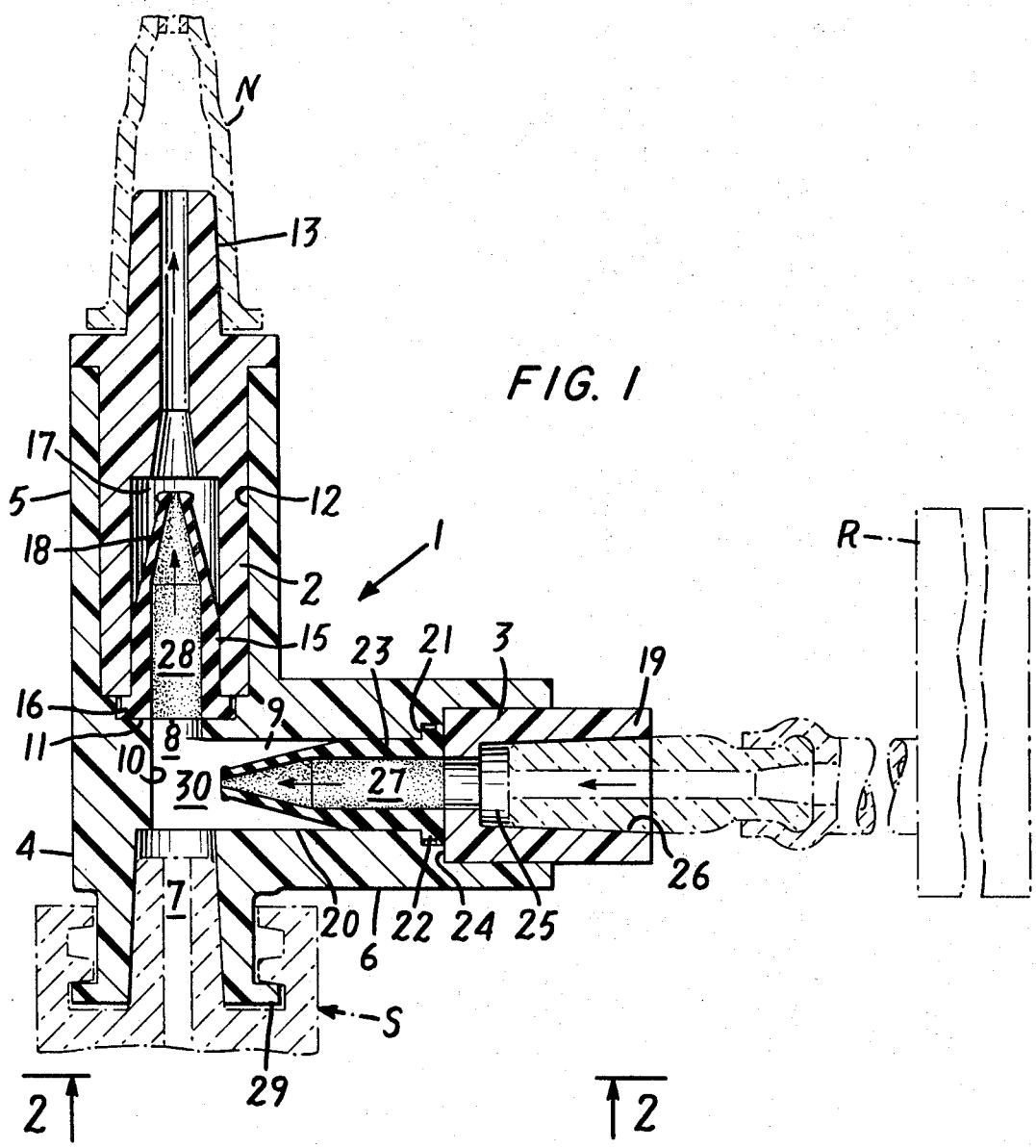
FIG. 1 is a view in cross-section of a typical twin valve T-connector in accordance with the invention, employing duck-bill check valves.

The twin valve T-connector shown in FIG. 1 has a coupling housing 1 that is molded in one piece entirely of plastic material, in this case, a modified phenylene oxide resin, sold commercially under the trade name Noryl. However, other thermoplastic or thermosetting moldable or castable plastic materials can be employed, such as ethyl cellulose, cellulose acetate-butyrate, cellulose propionate, nylon, polyphenylene oxide, polyethylene, polypropylene, polytetrafluoroethylene (Teflon), polychlorotrifluoroethylene (Kel-F), polystyrene, polyvinyl chloride, polycarbonates, polyoxymethylene (Delrin), epoxide resins, urea-formaldehyde, melamine-formaldehyde, phenol-formaldehyde, 2-methyl-pentene polymers, (TPX), and polyester resins.

The coupling body constitutes a unit made in three pieces, the housing 1, and two fitting inserts 2 and 3, all of which, as shown in the figures, are bonded together by softened integration of the plastic with a solvent, at their adjoining contacting surfaces. The coupling housing 1 as shown is in a T-shape, with three legs, 4, 5, 6, each of which bears a central passage 7, 8, 9, respectively, meeting at central chamber 30 of the housing. A T-shape has been adopted for convenience, but it will be evident that the configuration of the coupling is in no way critical. The three passage-bearing legs thereof can be set in the angles of a Y, or at any desired angle other than the 90° angle shown in FIG. 1. The 90° angle is preferred, however, for reasons that will be apparent from the following discussion.

The central passages 7, 8 and 9 intersect at the center of the coupling housing. The coupling housing 1 at the inner end of the passage 8 has a reentrant portion 10 that defines a valve seat 11. Beyond the valve seat 11 is a wide bore 12 that extends to the exterior of the housing.

A check valve 15 of the duckbill type is placed at the inner end of the bore 12 with the duckbill 18 facing outwardly from the valve seat 11, and with a base flange 16 abutting against the valve seat 11 in a leak-tight seal. The valve can be of any resilient or flexible heat-, water-, and solvent-resistant material, such as natural or synthetic rubber, for example, neoprene, or butadiene-styrene-acrylonitrile polymer, polypropylene, polyethylene, ethylene-propylene polymers, polyvinyl chloride or rubber hydrochloride resin. The base flange 16 of the valve is locked in position in the valve seat 11 by the fitting insert 2, which fits snugly in the bore 12 with its external wall bonded thereto by way of a solvent-formed bond.

It will be appreciated that the fitting insert 2 can also be held in the bore 12 by a press fit, and it can also be bonded therein by a suitable binder. The sides of the bore can be threaded, and the fitting insert 2 correspondingly threaded, so that it can be screwed tightly into the bore, in which event the check valve 15 can be removed for replacement. In the preferred embodiment, however, the fitting 2 is permanently fixed in the bore 12. In all cases, the fitting holds the flange 16 of the valve 15 tightly against the valve seat 11 in a leak-tight seal.

It will be evident that the check valve 15 ensures that flow in the passage 8 is only in the direction shown by the arrow.

The fitting 2 has a central passage 17 connecting at its inner end with passage 28 through the check valve 15. The outer end portion of the fitting 2 is provided with a male Luer fitting 13 to mate with a Luer tipped needle N or other fluid delivering or withdrawing device.

At the inner end of the passage 9 in arm 6, the housing 1 is formed with a reentrant portion 20, defining at its outer end a valve seat 21, against which is seated a flange 22 of a check valve 23, also of the duckbill type. This check valve faces inwardly, so that flow in the passage 9 proceeds only in the direction shown by the arrow.

Beyond the valve seat 21, the housing 1 widens, and defines a bore 24 extending to the exterior of the housing 1. Held within the bore in a snug fit is the fitting insert 3, the inner end of which abuts against the exterior face of the flange 22 of the check valve 23, and holds it tightly in position against the valve seat 21, in a leaktight seal. The fitting insert 3 has an internal passage 27 through the check valve, and this passage at its exterior portion 26 has a female Luer fitting 19 for reception of a tubing or other connector leading from a fluid dispensing device or reservoir.

The passage 7 does not contain a valve, and has a female Luer-Lok fitting 29, adapted to receive the delivery end of the syringe S which pumps fluid through the T-connector. The syringe tip is shown in dashed lines in FIG. 1.

The operation of the T-connector of FIG. 1 is as follows. A piston-type syringe S is threaded into the Luer-Lok 29 at the end of passage 7, on the exterior of arm 4. Into the female Luer socket 19 is fitted a Luer fitting on the end of a tube leading to a container R (shown in dashed lines in FIG. 1) containing a supply of fluid to be pumped. Onto male Luer fitting 13 is fitted a female Luer fitting of a needle N, for injection of the fluid into the body. Pumping action of the piston of the syringe on arm 4 draws fluid from the reservoir R into the interior chamber 30 on the housing 1 on the suction stroke, and then on the pumping stroke pumps this fluid through passages 8, 28 and 17 into and through the needle affixed to the Luer fitting 13. A volume of fluid is drawn from the reservoir equal to the capacity of the syringe attached to the arm 4, and this volume is injected with each stroke on the piston. It will be evident that a lesser volume can be drawn, if desired, and that the volume is completely controllable by the user, according to the length of the stroke of the piston.

The device can similarly be used to withdraw fluid from a body cavity. In this event, the needle or nozzle of the device is attached to the fitting 19 of arm 6, and the container or other receptacle attached to the fitting 13 of arm 5. Now, on the suction stroke, fluid is drawn out from the body cavity via passages 25, 27, and 9 and on the pumping stroke this fluid is pumped through passages 8, 28 and 17 into the receptacle.

It will be evident that the T-connector is readily fitted with any type of delivery mechanism, such as a Luer needle, nozzle, or other type of end piece, and that the T-connector can likewise be attached to any type of reservoir or receptacle. By the provision of standard couplings, standard delivery devices readily available in a hospital or doctor's office can be employed. At the same time, because of the small internal volume of the T-connector device, a high delivery pressure is obtained, and virtually no fluid is wasted with each use.

Figure 2:
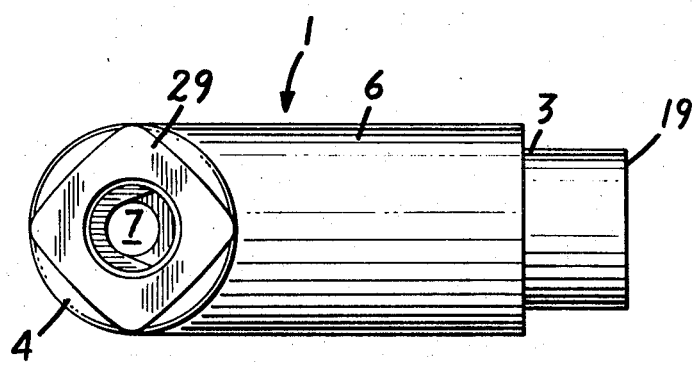
FIG. 2 is an end view, taken along the line 2—2 of FIG. 1, and looking in the direction of the arrows.

The device shown in FIGS. 1 and 2 is shown at four times its normal size. The actual capacity of the chamber 30 within valve 15, externally of check valve 23, and externally of the syringe tip, including the volume of passages 7, 8 and 9, can be as little as 0.1 cc., or even smaller.

Any type of check valve can be employed. The duckbill-type of valve with bulbous duckbill tips shown in FIGS. 1 and 2 is preferred. There can also be employed poppet-type valves, ball-type valves, umbrella-type valves, and flap-type valves.

Figure 3:
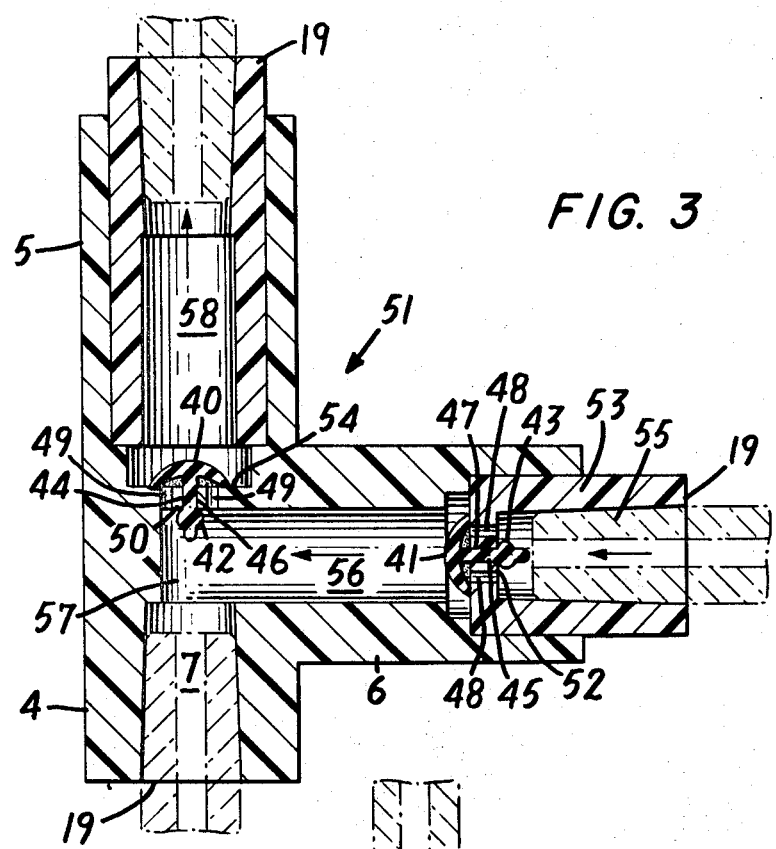
FIG. 3 is a view in cross-section of another embodiment of T-connector, employing umbrella valves.

FIG. 3 is a detailed view showing a coupling of the type of FIGS. 1 and 2 with umbrella valves in place of duckbill-type valves. The valves 40 and 41 have umbrella tops, and base flanges 42 and 43 connected to the umbrella portion by legs 44 and 45. The valves are fitted in the passages 46, 47, defined by reentrant portion 50 of the housing 51 and the end 52 of the fitting insert 53. The external face of wall portion 50 is a valve seat 54, against which the umbrella face of the valve seats, in a leak-tight seal. A similar valve seat is formed on the inner face of the fitting insert 53. The valves 40, 41 are held in the passages 46, 47 by the flanged bases 42, 43 of the valves. The valves close off the passages 48, 49 only when the umbrellas of the valves are seated against their respective valve seats. As a result, the valves control flow in the passages 55, 56, 57, 58, so that it proceeds only in the direction of the arrows.

In this T-connector each of the legs is provided with female Luer fittings 19.

Figure 4:
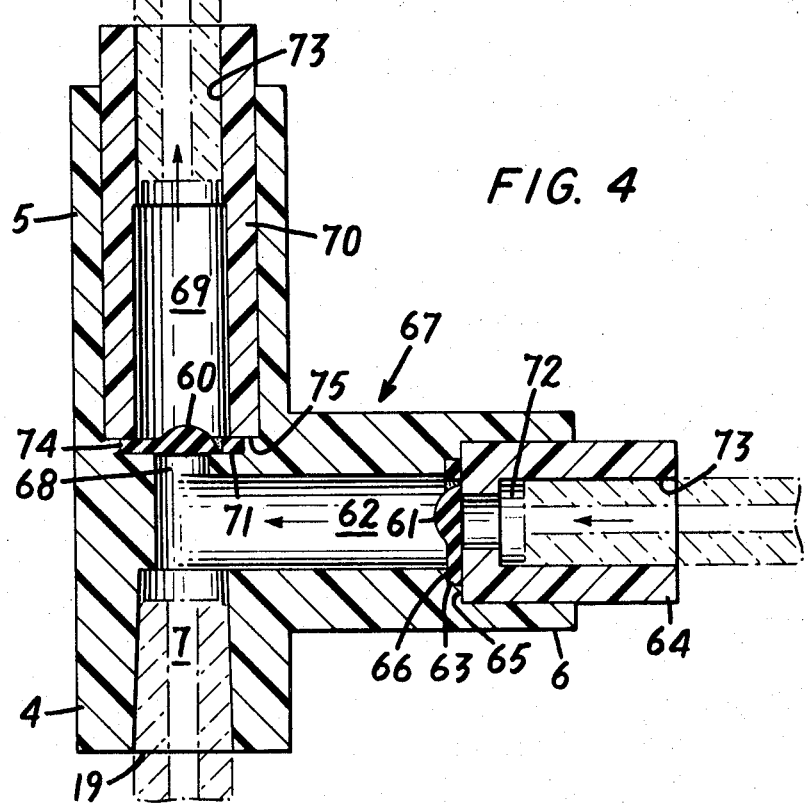
FIG. 4 is a view in cross-section of another embodiment of T-connector, employing flap valves.

FIG. 4 shows a coupling in which flap valves 60, 61 are employed. The flap valve 61 is free to open inwardly into the passage 62, and the flap valve is provided with a flange 63 which is held in place in a leak-tight seal by the inner face 65 of the fitting insert 64, in th recess 66 of the housing 67. Similarly, flap valve 61 disposed in passage 68 has a flange 74 which is held tightly in place by the inner face 75 of the fitting insert 70 in the recess 71, and the flap valve 60 is free to flap back and forth in the space afforded in the passage 69. The flap valves accordingly control flow through passage 72 of fitting insert 64, and passages 62, 68 and 69, so that it proceeds only in the direction shown by the arrows.

The T-connector of FIG. 4 has sockets 73 in the legs, 5, 6 into which tubing, shown in broken lines, may be inserted, and a female Luer fitting in the leg 4.

The operation of the T-connectors of FIGS. 3 and 4 is exactly the same as in the T-connector of FIGS. 1 and 2.

While the arrangements shown of the valves in the arms and passages of the connectors are the preferred ones, so as to give the direction of flow shown in the figures, it will be apparent that the twin valves can be placed in any two of the arms, for any desired direction of flow. The arrangement shown prevents the entrapment of air in the chamber of the coupling, and it also prevents the kinking of flexible hose or tubing which may be connected to the arms 2 and 3.

A special feature of the T-connectors of the invention is that it is possible to draw fluid from any closed container without the need of venting the interior of the container, so as to relieve the vacuum that results. This is because of the extremely small internal volume of the T-connector. Due to the small internal volume (less than 1 cc. and preferably less than 0.1 cc.) a high compression ratio is obtained. This makes it possible to obtain pressures in a container of less than the vapor pressure of water and many other liquids. This means that no air need be introduced into a container to pump liquid out of the container. Thus, when the T-connector of the invention is employed, there is no danger of pumping contaminated air into a sterile liquid being pumped into the body.

In addition, it is possible to pump gases out of a container until extremely low pressures are reached. For example, with a valve having 0.1 cc. internal volume and a 50 cc. syringe, it is possible to pump a gas out of a container until a vaccum of $\frac{1}{500}$ atmosphere is reached. Moreover, it is possible using a valve in accordance with this invention to pump gases with almost 100% volumetric efficiency.

The construction of the T-connector is such that it is possible to mold and cast it from any plastic that is thermoplastic or thermosetting but in a moldable or castable stage of polymerization. It can in fact be made easily in one unit from as few as five pieces, the coupling housing, the two valves, and two fitting inserts or valve insert pieces. If desired, the coupling housing also can be made in sagittal halves, and bonded together with the valves and socket adapters in place. The several parts can be permanently bonded together, by heat-sealing, integration of adjoining parts by fusing or solvent-bonding, or by an adhesive or bonding agent.

It may also be possible in some cases to mold the coupling housing in one piece, so that the valves can be inserted in their respective passages and sealed in place, with the ends of the passages being molded in the shape needed for reception of the desired types of connections. This reduces the total number of pieces to three; and eliminates the fitting insert pieces shown in the drawings.

The resulting device is simple, and easy to handle and clean. It is so inexpensive that it can be discarded after one use, for sanitary reasons. Since it can be entirely of heat-resistant and solvent-resistant material, it can be sterilized before use, and stored in a sterilizer for a considerable period of time, if desired, without deleterious effect.

It is possible to fabricate a coupling that is capable of withstanding the pressure necessary to pump from any type of container because the coupling can be formed by a molding or casting technique from nonresilient plastic materials with walls of a thickness to resist any fluid pressures that are likely to be encountered. In this respect, the nonresilient or rigid coupling of the invention is superior to couplings which have employed as a component of the construction a flexible tubing which incorporates the valves or connections to the pumping syringe or fluid supply.

Having regard to the foregoing disclosure, the following is claimed as the inventive and patentable embodiments thereof:

1. A twin valve T-connector for coupling a syringe to a liquid medicament supply, for delivery to a body via a fluid delivery device of a volume of liquid medicament in excess of the capacity of the syringe, comprising, in combination, a coupling body of plastic material having three interconnected passages therethrough; check valves in two of said passages controlling flow of fluid therethrough in a single direction, the check valve in at least one of said passages having retaining means at an outer peripheral portion thereof, a fitting insert in each valve-containing passage, comprising a plastic material which is either the same as or compatible with the plastic material of the coupling body, the fitting insert extending into the said passage from the outside of the coupling body, and having a central passage therethrough for passage of fluid into and out from the T-connector, said valve retaining means being retained by the fitting insert against the coupling body and a peripheral portion of the fitting insert closely abutting an inner wall of the passage, and being integrated with the plastic material of the coupling body, obliterating any seam therebetween at that portion, and forming a leaktight barrier, the fitting insert thus retaining the valve in the coupling body in a permanent leaktight fit; the other check valve being fixed in the other passage in a leaktight seal between the retaining means and either the coupling body or a like insert; and means at an outer portion of each passage adapted for connection of said passage and the coupling to at least one member selected from the group consisting of a liquid medicament supply container, a fluid delivery device, a syringe, and interconnecting tubing.

2. A twin valve T-connector in accordance with claim 1, in which both coupling body and inserts are formed of the same plastic material.

3. A twin valve T-connector in accordance with claim 1, in which the coupling body is molded in one piece, in a T-shape, with three interconnected passages therethrough.

4. A twin valve T-connector in accordance with claim 1, in which the inserts are fitted in a recess in each passage so that the only surfaces thereof presented to fluid pressure are side wall surfaces of the internal passages therethrough.

5. A twin valve T-connector in accordance with claim 1, in which the check valves are each made of rubbery material, fixedly held in the passage at one peripheral retaining portion thereof, and at another peripheral portion thereof engaging a valve seat or a like valve member, adapted to crack open in a flex-action movement away from the valve seat or like valve member so as to open the passage.

6. A twin valve T-connector for coupling a syringe to a liquid medicament supply, for delivery to a body via a fluid delivery device of a volume of liquid medicament in excess of the capacity of the syringe, comprising, in combination a plastic coupling body having three interconnected passages therein; check valves in two of said passages controlling flow of fluid therethrough in a single direction, said check valves each comprising a valve member of rubbery material, having retaining means thereon held in a fixed position in its passage in a leak-tight seal, and movable in a flex-action movement at a peripheral portion thereof to engage a valve seat or like valve member in a relatively leak-tight planar seal, so as to close the passage, and to crack open in a flex-action movement with respect to the fixed portion away from the valve seat or like valve member, said valve member presenting a surface exposed and responsive to fluid pressure on each side thereof and being responsive to a fluid pressure on one side tending to bias the valve member against the valve seat or like valve member in a leak-tight seal therewith and thus prevent flow from that side, and being responsive to fluid pressure on the other side to move away from the valve seat or like valve member and thus permit flow from that side at the crack-open pressure and thereafter; a fitting insert in each valve-containing passage of a plastic material which is the same as, or compatible with, the plastic material of the coupling body, the fitting insert extending into the said passage from the outside of the coupling body, and having a central passage therethrough for passage of fluid into and out from the T-connector, each fitting insert engaging the valve in its passage so as to capture the retaining means on the valve between the body and the insert, and having a peripheral sidewall abutting the side walls of the passage and being integrated with the plastic material of the coupling body there, obliterating any seam at that portion therebetween, and forming a leak-tight barrier, the fitting inserts thus retaining the valves in the coupling body in a permanent leak-tight fit, and means at an outer portion of each passage adapted for connection of said passage and the coupling to at least one member selected from the group consisting of a liquid medicament supply container, a fluid delivery device, a syringe, and interconnecting tubing.

7. A twin valve T-connector in accordance with claim 6, in which the total open volume of the flow passages within the T-connector including the space into which the valves open is less than 1 cc.

8. A twin valve T-connector in accordance with claim 7, in which the twin valves are duckbill valves having tapered walls diminishing in thickness from the neck to the bill of the valve.

9. A twin-valve T-connector in accordance with claim 8, in which the total open volume is less than 0.1 cc.

10. A twin valve T-connector in accordance with claim 8, in which the through passages and valves when open together define a smooth substantially uninterrupted flow path through the T-connector, all of the open passages being straight-sided, allowing the venting of all air therewithin in at least one position of the T-connector.

11. A twin valve T-connector in accordance with claim 6, in which the through passages and valves when open together define a smooth substantially uninterrupted flow path through the T-connector, all of the open passages being straight-sided, allowing the venting of all air therewithin in at least one position of the T-connector.

12. A twin valve T-connector for coupling a syringe to a liquid medicament supply, for delivery to a body via a fluid delivery device of a volume of liquid medicament in excess of the capacity of the syringe, comprising, in combination, a coupling body having three interconnected passages therein; check valves in two of said passages controlling flow of fluid therethrough in a single direction, said check valves each comprising a valve member of rubbery material, having retaining means thereon held in a fixed position in its passage in a leak-tight seal, and movable in a flex-action movement at a peripheral portion thereof to engage a valve seat or valve like member in a relatively leak-tight planar seal, so as to close the passage, and to crack open in a flex-action movement with respect to the fixed portion away from the valve seat or like valve member, said valve member presenting a surface exposed and responsive to fluid pressure on each side thereof and being responsive to a fluid pressure on one side tending to bias the valve member against the valve seat or like valve member in a leak-tight seal therewith and thus prevent flow from that side, and being responsive to fluid pressure on the other side to move away from the valve seat or like valve member and thus permit flow from that side at the crack-open pressure and thereafter; a fitting insert in each valve-containing passage of a plastic material which is the same, or compatible with the plastic material of the coupling body, the fitting insert extending into the said passage from the outside of the coupling body, and having a central passage therethrough for passage of fluid into and out from the T-connector, each fitting insert engaging the valve in its passage so as to capture the retaining means on the valve between the body and the insert, and having a peripheral sidewall abutting the side walls of the passage and being bonded with the material of the coupling body, forming a leaktight barrier, the fitting inserts thus retaining the valves in the coupling body in a permanent leaktight fit, and means at an outer portion of each passage adapted for connection of said passage and the coupling to at least one member selected from the group consisting of a liquid medicament supply container, a fluid delivery device, a syringe, and interconnecting tubing.

13. A twin valve T-connector in accordance with claim 12, in which the total open volume of the flow passages within the T-connector including the space into which the valves open is less than 1 cc.

14. A twin valve T-connector in accordance with claim 13, in which the twin valves are duckbill valves having tapered walls diminishing in thickness from the neck to the bill of the valve.

15. A twin valve T-connector in accordance with claim 14, in which the total open volume is less than 0.1 cc.

16. A twin valve T-connector in accordance with claim 15, in which the through passages and valves when open together define a smooth substantially uninterrupted flow path through the T-connector, all of the open passages being straight-sided, allowing the venting of all air therewithin in at least one position of the T-connector.

17. A twin valve T-connector in accordance with claim 12, in which the through passages and valves when open together define a smooth substantially uninterrupted flow path through the T-connector, all of the open passages being straight-sided, allowing the venting of all air therewithin in at least one position of the T-connector.

References Cited

UNITED STATES PATENTS

| | | | |
|---|---|---|---|
| 996,588 | 6/1911 | Kennedy | 137—515.7 |
| 2,710,004 | 6/1955 | Stamper | 128—214 |
| 3,254,650 | 6/1966 | Collito | 285 Mastic |
| 3,386,470 | 6/1968 | Goda | 137—525X |
| 3,403,696 | 10/1968 | Pynchon | 137—525X |
| 3,422,844 | 1/1969 | Grise | 137—525.1 |
| 2,605,784 | 8/1952 | Snider | 137—525.1 |
| 2,637,413 | 5/1953 | Fox et al. | 137—525.1X |
| 2,662,724 | 12/1953 | Kravagna | 137—525.1 |
| 3,132,665 | 5/1964 | Rovin et al. | 137—512 |

FOREIGN PATENTS

| | | | |
|---|---|---|---|
| 989,642 | 4/1965 | Great Britain | 92—13.7 |

ROBERT G. NILSON, Primary Examiner

U.S. Cl. X.R.

137—515.7, 525.1, 525.3; 417—566